United States Patent
Li et al.

(10) Patent No.: US 11,894,568 B2
(45) Date of Patent: Feb. 6, 2024

(54) SECONDARY BATTERY, BATTERY COLUMN, AND APPARATUS

(71) Applicant: CONTEMPORARY AMPEREX TECHNOLOGY CO., LIMITED, Fujian (CN)

(72) Inventors: Xiang Li, Fujian (CN); Yulian Zheng, Fujian (CN); Peng Wang, Fujian (CN); Shoujun Huang, Fujian (CN); Xinxiang Chen, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 276 days.

(21) Appl. No.: 17/462,741

(22) Filed: Aug. 31, 2021

(65) Prior Publication Data

US 2021/0399372 A1 Dec. 23, 2021

Related U.S. Application Data (63) Continuation of application No. PCT/CN2020/127908, filed on Nov. 10, 2020.

(30) Foreign Application Priority Data

Nov. 15, 2019 (CN) .......................... 201921982166.2

(51) Int. Cl.
*H01M 50/188* (2021.01)
*H01M 50/147* (2021.01)
(Continued)

(52) U.S. Cl.
CPC ............. *H01M 50/188* (2021.01); *B60K 1/04* (2013.01); *H01M 50/147* (2021.01);
(Continued)

(58) Field of Classification Search
CPC ............. B60K 1/04; B60K 2001/0438; H01M 2220/20; H01M 50/147; H01M 50/157;
(Continued)

(56) References Cited

U.S. PATENT DOCUMENTS

2012/0183818 A1* 7/2012 Byun .................... H01M 50/15
429/61
2014/0011074 A1 1/2014 Oda et al.
(Continued)

FOREIGN PATENT DOCUMENTS

CN 104494038 A 4/2015
CN 107275230 A 10/2017
(Continued)

OTHER PUBLICATIONS

International Search Report dated Feb. 9, 2021 issued in PCT/CN2020/127908.
Chung, E. et al., "Adhesion of Poly(phenylene sulfide) Resin with Polymeric Film of Triazine Thiol on Aluminum Surface Modified by Anodic Oxidation", Journal of Biomedical Nanotechnology, Jan. 1, 2015, pp. 157-164, vol. 11, No. 1.
(Continued)

*Primary Examiner* — Lingwen R Zeng
(74) *Attorney, Agent, or Firm* — Scully, Scott, Murphy & Presser, P.C.

(57) ABSTRACT

This application relates to a secondary battery, a battery column, and an apparatus. The secondary battery includes a top cover plate, having an outer surface and an inner surface disposed opposite each other in a thickness direction of the top cover plate and an electrode lead-out hole extending along the thickness direction; a pole, disposed in the electrode lead-out hole, where the pole includes a first metal layer and a second metal layer, and the first metal layer and the second metal layer are stacked along a direction from the inner surface to the outer surface; an insulation member, disposed between the top cover plate and the pole; and a first bonding layer, disposed between the insulation member and the first metal layer, where the insulation member is her-
(Continued)

metically connected to the first metal layer through the first bonding layer.

12 Claims, 6 Drawing Sheets

(51) Int. Cl.
| | |
|---|---|
| *H01M 50/209* | (2021.01) |
| *H01M 50/543* | (2021.01) |
| *B60K 1/04* | (2019.01) |
| *H01M 50/562* | (2021.01) |
| *H01M 50/529* | (2021.01) |
| *H01M 50/159* | (2021.01) |
| *H01M 50/157* | (2021.01) |
| *H01M 50/197* | (2021.01) |

(52) U.S. Cl.
CPC ....... *H01M 50/209* (2021.01); *H01M 50/543* (2021.01); *B60K 2001/0438* (2013.01); *H01M 50/157* (2021.01); *H01M 50/159* (2021.01); *H01M 50/197* (2021.01); *H01M 50/529* (2021.01); *H01M 50/562* (2021.01); *H01M 2220/20* (2013.01); *Y02E 60/10* (2013.01)

(58) Field of Classification Search
CPC ............. H01M 50/159; H01M 50/188; H01M 50/197; H01M 50/209; H01M 50/529; H01M 50/543; H01M 50/562; Y02E 60/10
See application file for complete search history.

(56) References Cited

U.S. PATENT DOCUMENTS

| | | |
|---|---|---|
| 2017/0294395 A1 | 10/2017 | Happoya |
| 2018/0083302 A1 | 3/2018 | Koo et al. |
| 2020/0144585 A1 | 5/2020 | Zeng et al. |

FOREIGN PATENT DOCUMENTS

| | | |
|---|---|---|
| CN | 107658394 A | 2/2018 |
| CN | 209056523 U | 7/2019 |
| CN | 209447920 U | 9/2019 |
| CN | 211017169 U | 7/2020 |
| JP | 2008027823 A | 2/2008 |
| JP | 2008027849 A | 2/2008 |
| JP | 2010092658 A | 4/2010 |
| JP | 2012151097 A | 8/2012 |
| JP | 2014038819 A | 2/2014 |
| JP | 2019091656 A | 6/2019 |
| JP | 2019160746 A | 9/2019 |
| KR | 20180032061 A | 3/2018 |
| WO | 2012160681 A1 | 11/2012 |
| WO | 2015030137 A1 | 3/2015 |

OTHER PUBLICATIONS

Extended European Search Report dated May 10, 2022 received in European Patent Application No. EP 20887690.4.
Notice of Reasons for Refusal dated Jul. 3, 2023 received in Japanese Patent Application No. JP 2022-526449.
Notice of Allowance dated Nov. 21, 2023 received in Korean patent Application No. KR 10-2022-7015309.
Decision to Grant a Patent dated Dec. 18, 2023 received in Japanese Patent Application No. JP 2022-526449.

\* cited by examiner

SECONDARY BATTERY, BATTERY COLUMN, AND APPARATUS

CROSS-REFERENCE TO RELATED APPLICATIONS

This application is a continuation of International Application No. PCT/CN2020/127908, filed on Nov. 10, 2020, which claims priority to Chinese Patent Application No. 201921982166.2, filed on Nov. 15, 2019. The disclosures of the aforementioned applications are hereby incorporated by reference in their entireties.

TECHNICAL FIELD

Embodiments of this application relate to the field of battery technologies, and in particular, to a secondary battery, a battery column, and an apparatus.

BACKGROUND

Secondary batteries have been widely used in the fields of hybrid vehicles and electric vehicles due to their advantages such as high energy, high capacity, and high power. A secondary battery includes a housing, an electrode assembly disposed in the housing, a top cover plate hermetically connected to the housing, a pole disposed on the top cover plate, an insulation member, and a current collector connecting poles and tabs of the electrode assembly. The poles hermetically mate with the top cover plate through the insulation member. However, during use of the secondary battery, sealing failure or sealing performance deterioration of the insulation member may be caused when the insulation member shifts or falls off, affecting use safety of the secondary battery.

SUMMARY

This application is intended to resolve a prior-art technical problem of sealing failure or sealing performance deterioration of an insulation member caused when the insulation member shifts or falls off.

According to an aspect, an embodiment of this application proposes a secondary battery that includes:
- a top cover plate, having an outer surface and an inner surface disposed opposite each other in a thickness direction of the top cover plate and an electrode lead-out hole extending along the thickness direction; a pole, disposed in the electrode lead-out hole, where the pole includes a first metal layer and a second metal layer, and the first metal layer and the second metal layer are stacked along a direction from the inner surface to the outer surface; an insulation member, disposed between the top cover plate and the pole; and a first bonding layer, disposed between the insulation member and the first metal layer, where the first metal layer and the first bonding layer are bonded by a chemical bond, the insulation member and the first bonding layer are bonded by a chemical bond, and the insulation member is hermetically connected to the first metal layer through the first bonding layer.

Therefore, tight and reliable connections are formed between the first metal layer and the first bonding layer and between the insulation member and the first bonding layer, effectively improving connection strength between the first metal layer and the insulation member, and reducing the possibility of sealing failure or sealing performance deterioration, between the first metal layer and the insulation member, caused when the insulation member shifts or falls off, thereby improving use safety of the secondary battery.

According to an aspect of the embodiments of this application, the first metal layer has a first concave portion facing away from the second metal layer, part of the insulation member extends into the first concave portion, and the first bonding layer extends to between the first concave portion and the insulation member. There is only one annular first concave portion, or there are two or more first concave portions, and the two or more first concave portions are spaced apart along a circumferential direction of the pole.

Therefore, the part of the insulation member extending into the first concave portion and the part of the first bonding layer extending to the first concave portion can jointly limit a position of the pole in an axial direction. This is beneficial to further reducing the possibility that the pole shifts in the axial direction when receiving stress in the axial direction.

According to an aspect of the embodiments of this application, the secondary battery further includes a second bonding layer, the second bonding layer is disposed between the insulation member and the second metal layer, the second metal layer and the second bonding layer are bonded by a chemical bond, the insulation member and the second bonding layer are bonded by a chemical bond, and the insulation member is hermetically connected to the second metal layer through the second bonding layer.

Therefore, overall connection strength and sealing reliability of the insulation member and the pole are improved, reducing the possibility of sealing failure or sealing performance deterioration caused by relative displacement between the insulation member and the pole, thereby reducing the possibility that an electrolyte corrodes the second metal layer after entering between the insulation member and the second metal layer or overflows from the pole.

According to an aspect of the embodiments of this application, the second metal layer has a second concave portion facing away from the first metal layer, part of the insulation member extends to a region close to the second concave portion, and the second bonding layer extends to between the second concave portion and the insulation member.

Therefore, the part of the insulation member extending into the second concave portion and the part of the second bonding layer extending to the second concave portion can jointly limit a position of the pole in an axial direction. This is beneficial to further reducing the possibility that the pole shifts in the axial direction when receiving stress in the axial direction.

According to an aspect of the embodiments of this application, there is only one annular second concave portion, or there are two or more second concave portions, and the two or more second concave portions are spaced apart along the circumferential direction of the pole.

The second concave portion is annular, and therefore a force is uniformly applied to the pole.

According to an aspect of the embodiments of this application, the first metal layer is a copper layer or a copper alloy layer, and the second metal layer is an aluminum layer or an aluminum alloy layer; and/or
  the first bonding layer includes a first oxide film and a triazine thiol derivative disposed on the first oxide film, and the second bonding layer includes a second oxide film and a triazine thiol derivative disposed on the second oxide film.

Therefore, when the first metal layer is the copper layer or the copper alloy layer, and the second metal layer is the aluminum layer or the aluminum alloy layer, it is beneficial to welding of the first metal layer and a negative electrode adapting piece, or the first metal layer and tabs. The copper element and the triazine thiol derivative can generate a copper-sulfur chemical bond, and the triazine thiol derivative forms a covalent bond with the insulation member.

According to an aspect of the embodiments of this application, the second metal layer is directly connected to the insulation member, tensile strength between the first metal layer and the first bonding layer is greater than tensile strength between the second metal layer and the insulation member, and tensile strength between the insulation member and the first bonding layer is greater than the tensile strength between the second metal layer and the insulation member.

Therefore, after the second metal layer is welded to a current collection sheet, when an end of the second metal layer leaving the first metal layer is subject to a pulling force from the current collection sheet, the second metal layer is allowed to move slightly. However, the pulling force does not cause the first metal layer to be separated from the insulation member, thereby improving sealing reliability of the pole and the insulation member.

According to an aspect of the embodiments of this application, the secondary battery further includes a third bonding layer, the third bonding layer is disposed between the top cover plate and the insulation member, the top cover plate and the third bonding layer are bonded by a chemical bond, the insulation member and the third bonding layer are bonded by a chemical bond, and the insulation member is hermetically connected to the top cover plate through the third bonding layer.

The top cover plate and the third bonding layer are bonded by a chemical bond, and the insulation member and the third bonding layer are bonded by a chemical bond. Therefore, tight and reliable connections are formed between the top cover plate and the third bonding layer and between the insulation member and the third bonding layer, effectively improving connection strength between the top cover plate and the insulation member, and reducing the possibility of sealing failure or sealing performance deterioration, between the top cover plate and the insulation member, caused when the insulation member shifts or falls off, thereby improving use safety of the secondary battery.

According to an aspect of the embodiments of this application, the top cover plate is an aluminum layer or an aluminum alloy layer; and/or the first bonding layer includes a first oxide film and the triazine thiol derivative disposed on the first oxide film, and the third bonding layer includes a third oxide film and a triazine thiol derivative disposed on the third oxide film.

The first bonding layer includes the first oxide film and the triazine thiol derivative disposed on the first oxide film. Therefore, the copper element and the triazine thiol derivative can generate a copper-sulfur chemical bond, and the triazine thiol derivative forms a covalent bond with the insulation member.

According to an aspect of the embodiments of this application, a thickness of the first metal layer is greater than or equal to that of the second metal layer along an axial direction of the electrode lead-out hole; and/or
 a maximum outer diameter of the pole is less than a minimum aperture of the electrode lead-out hole.

The maximum outer diameter of the pole is less than the minimum aperture of the electrode lead-out hole. This is beneficial to reducing a size of the pole and reducing space utilization of the pole.

According to an aspect of the embodiments of this application, the insulation member includes a barium sulfate particle; and/or the insulation member includes a fiber structure.

The insulation member is used to seal the top cover plate and the pole.

According to an aspect of the embodiments of this application, at least part of an outer peripheral surface of the first metal layer is covered by the first bonding layer along the axial direction of the electrode lead-out hole; and/or the first bonding layer is 50 nanometers to 500 nanometers in thickness.

The at least part of the outer peripheral surface of the first metal layer is covered by the first bonding layer. Therefore, this is beneficial to increasing an area of a connection region between the first metal layer and the first bonding layer, and improving connection strength and sealing reliability.

According to the secondary battery in this embodiment of this application, the pole hermetically mates with the top cover plate through the first bonding layer and the insulation member. The first metal layer and the first bonding layer are bonded by a chemical bond, the insulation member and the first bonding layer are bonded by a chemical bond, and therefore, tight and reliable connections are formed between the first metal layer and the first bonding layer and between the insulation member and the first bonding layer, effectively improving the connection strength between the first metal layer and the insulation member, and reducing the possibility of sealing failure or sealing performance deterioration, between the first metal layer and the insulation member, caused when the insulation member shifts or falls off, thereby improving use safety of the secondary battery.

According to another aspect, an embodiment of this application provides a battery column that includes the foregoing secondary battery.

The battery column provides electrical energy to a drive motor.

According to another aspect, an embodiment of this application provides an apparatus using a secondary battery as a power source. The apparatus includes the foregoing secondary battery.

The apparatus using a secondary battery as a power source according to this embodiment of this application may include, but is not limited to, a vehicle, a ship, an aircraft, or the like.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

The features, advantages, and technical effects of example embodiments of this application are described below with reference to the accompanying drawings.

In the drawings, the drawings may not be drawn to an actual scale.

REFERENCE SIGNS 1. battery pack;
10. battery module;
20. secondary battery; 21. housing; 22. electrode assembly;
30. top cover assembly; 31. top cover plate; 31*a*. outer surface; 31*b*. inner surface; 31*c*. electrode lead-out hole; 32. pole; 321. first metal layer; 321*a*. first concave portion; 321*aa*. first axially extending surface; 321*ab*. first radially extending surface; 322. second metal layer; 322*a*. second concave portion; 322*aa*. second axially extending surface; 322*ab*. second radially extending surface; 322*b*. third concave portion; 322*ba*. third axially extending surface; 322*bb*. third radially extending surface; 33. insulation member; 34. first bonding layer; 35. second bonding layer; 36. third bonding layer; 37. insulation plate;
40. current collection sheet; and
X. axial direction.

DESCRIPTION OF EMBODIMENTS

The following describes embodiments of this application in further details with reference to the accompanying drawings and embodiments. The detailed description of the following embodiments and drawings are used to exemplarily illustrate principles of this application, but cannot be used to limit the scope of this application, that is, this application is not limited to the described embodiments.

In the descriptions of this application, it should be noted that unless otherwise stated, "a plurality of" means two or more, orientations or position relationships indicated by the terms "up", "down", "left", "right", "inside", "outside", and the like are merely intended to simplify description of this application for a purpose of easy description, rather than indicate or imply that an apparatus or a part must have a particular direction or must be constructed and operated in a particular orientation. Therefore, this shall not be construed as any limitation on this application. In addition, the terms "first", "second", and the like are merely intended for a purpose of description, and shall not be understood as an indication or implication of relative importance.

In the descriptions of this application, it should be further noted that unless otherwise specified and defined explicitly, the terms "mounted", "interconnected", and "connected" are to be interpreted broadly, for example, being fixedly connected, or detachably connected, or integrally connected, or directly connected, or indirectly connected through an intermediate medium. A person of ordinary skill in the art can understand specific meanings of these terms in this application based on specific situations.

For better understanding of this application, the following describes the embodiments of this application with reference to FIG. 1 to FIG. 8.

Figure 1:
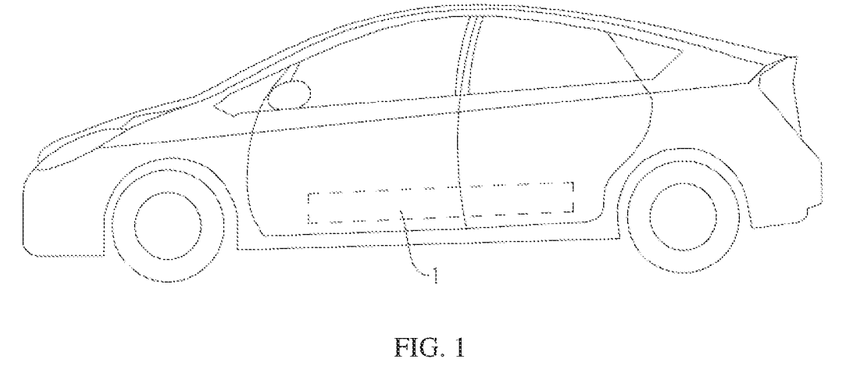
FIG. 1 is a schematic structural diagram of a vehicle according to an embodiment of this application.

An embodiment of this application provides an apparatus using a secondary battery 20 as a power source. The apparatus may be, but is not limited to, a vehicle, a ship, or an aircraft. Referring to FIG. 1, an embodiment of this application provides a vehicle that includes a vehicle body and a battery column. The battery column is installed in the vehicle body. The vehicle may be a battery electric vehicle, a hybrid vehicle, or an extended-range vehicle. The vehicle body is provided with a drive motor electrically connected to the battery column. The battery column provides electrical energy to the drive motor. The drive motor is connected to wheels on the vehicle body through a transmission mechanism to drive the vehicle. In some embodiments, the battery column may be horizontally disposed at the bottom of the vehicle body.

Figure 2:
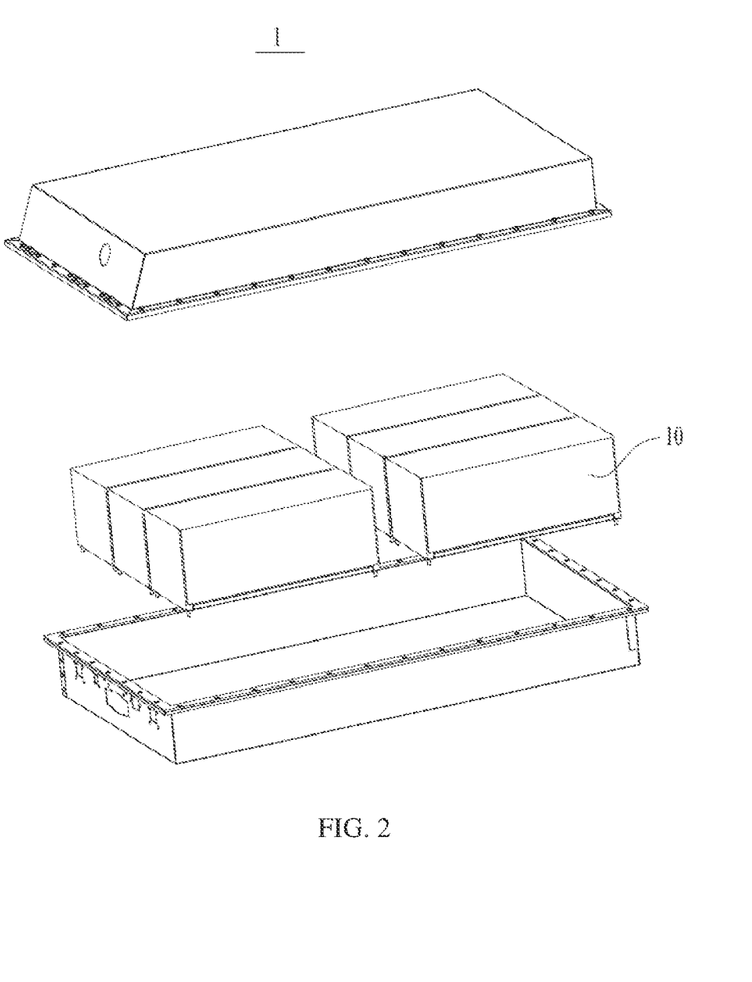
FIG. 2 is a schematic exploded view of a battery pack according to an embodiment of this application.

As shown in FIG. 2, the battery column may be a battery pack 1. The battery pack 1 may be disposed in a plurality of ways. In some embodiments, the battery pack 1 includes a box body and a battery module 10 disposed in the box body. There are one or more battery modules 10. The one or more battery modules 10 are arranged in the box body. The box body is not limited to a specific type. The box body may be frame-shaped, disk-shaped, or box-shaped. In some embodiments, the box body may include a lower box body for accommodating the battery module 10 and an upper box body mating with the lower box body. After the upper box body is mated with the lower box body, an accommodation portion for accommodating the battery module 10 is formed. It can be understood that the battery column may also be the battery module 10.

Figure 3:
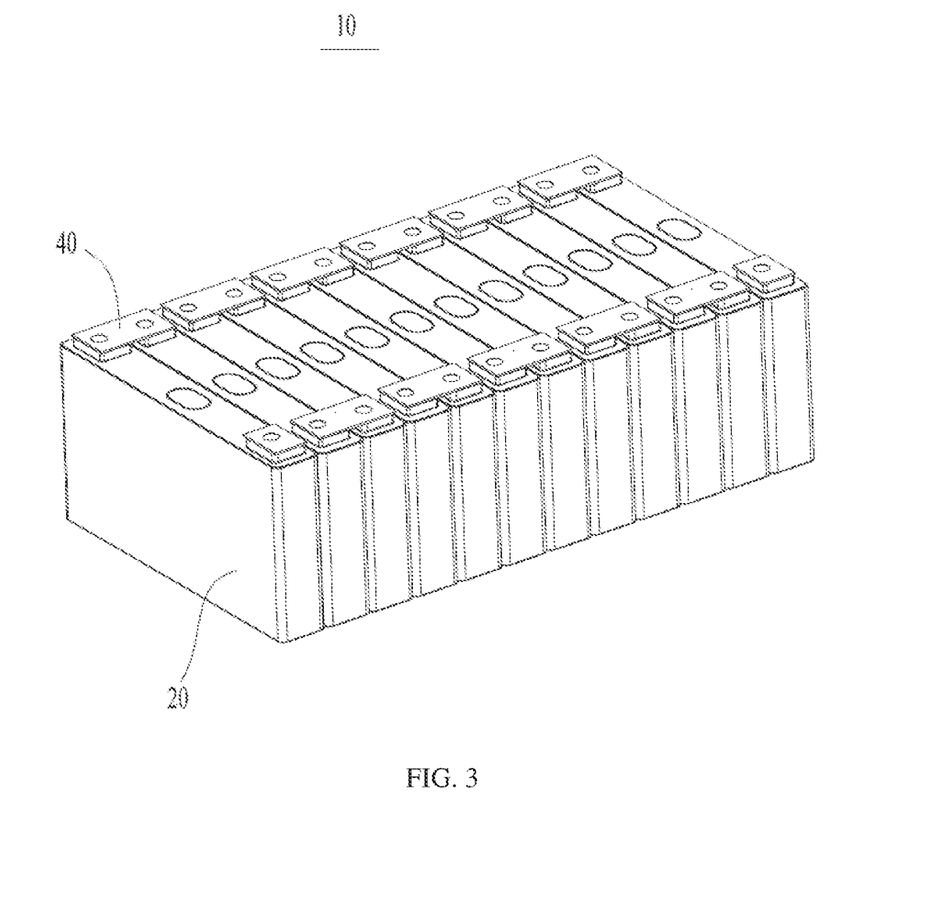
FIG. 3 is a schematic structural diagram of a battery module according to an embodiment of this application.

Referring to FIG. 3, the battery module 10 includes a plurality of secondary batteries 20. The battery module 10 may be disposed in a plurality of ways. In an embodiment, the battery module 10 includes an accommodation portion and the plurality of secondary batteries 20 located in the accommodation portion. The plurality of secondary batteries 20 are disposed side by side in the accommodation portion. The accommodation portion may be disposed in a plurality of ways. For example, the accommodation portion includes a housing and a cover plate covering the housing; or the accommodation portion includes side plates and end plates that are successively connected to form enclosure space; or the accommodation portion includes two oppositely disposed ends plates and a strap surrounding outsides of the end plates and the secondary batteries 20.

Figure 4:
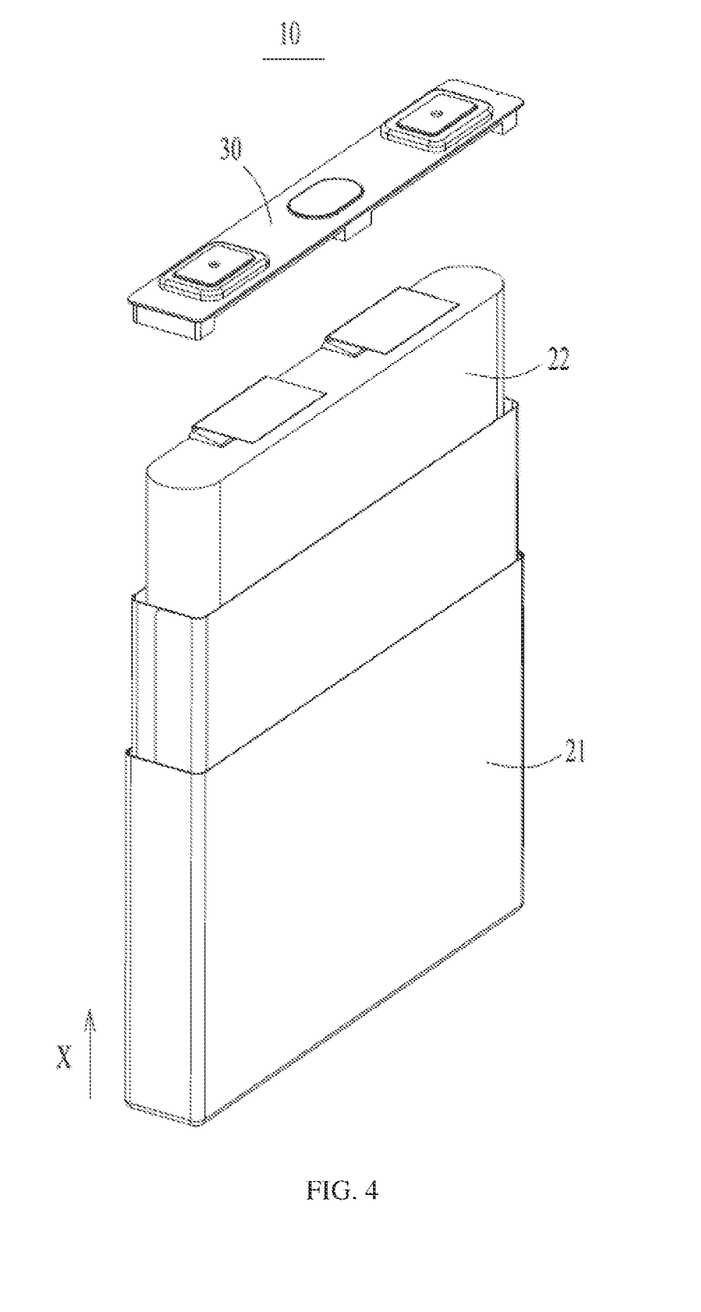
FIG. 4 is a schematic exploded view of a secondary battery according to an embodiment of this application.

Referring to FIG. 4, the secondary battery 20 in this embodiment of this application includes a housing 21, an electrode assembly 22 disposed in the housing 21, and a top cover assembly 30 hermetically connected to the housing 21.

The housing 21 in this embodiment of this application is a square or in another shape. The housing 21 has internal space for accommodating the electrode assembly 22 and an electrolyte, and an opening communicating with the internal space. The housing 21 may be made of materials such as aluminum, aluminum alloy, or plastic.

A body portion of the electrode assembly 22 in this embodiment of this application may be formed by stacking or winding a first electrode plate, a second electrode plate, and a separator located between the first electrode plate and the second electrode plate. The separator is an insulator between the first electrode plate and the second electrode plate. The body portion in this embodiment is of a flat structure on a whole, and has a predetermined thickness, height, and width. An axial direction of the body portion is a height direction of the body portion. The body portion has two end surfaces opposite each other in the axial direction of the body portion. In this embodiment, the first electrode plate being a positive electrode plate and the second electrode plate being a negative electrode plate are used as an example for description. An active material for the positive electrode plate is applied on a coating region of the positive electrode plate, and an active material for the negative electrode plate is applied on a coating region of the negative electrode plate. Uncoated regions extending from the coating regions of the body portion serve as tabs. The electrode assembly 22 includes two tabs: a positive tab and a negative tab. The positive tab extends from the coating region of the positive plate, and the negative tab extends from the coating region of the negative plate. The body portion has large surfaces and small surfaces alternately disposed in a circumferential direction of the body portion.

Figure 5:
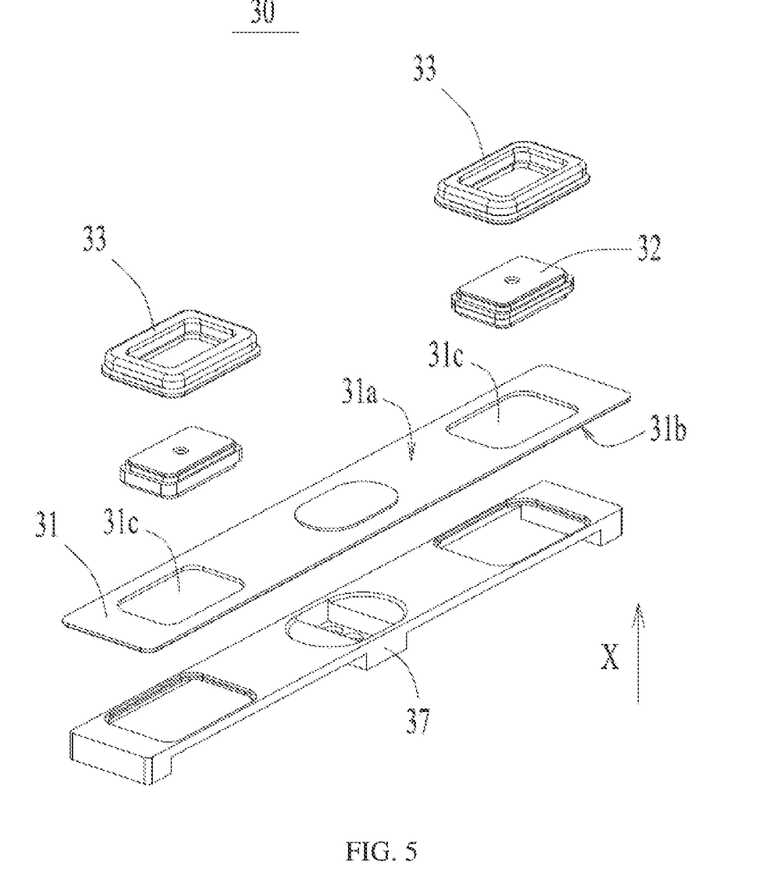
FIG. 5 is a schematic exploded view of a top cover assembly according to an embodiment of this application.
Figure 6:
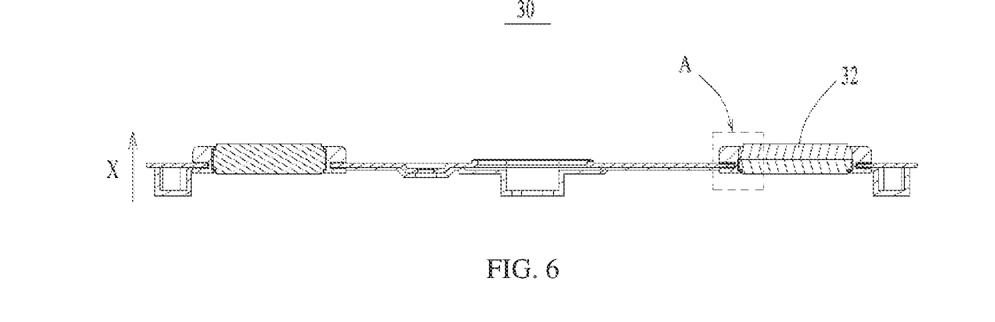
FIG. 6 is a schematic structural cross-sectional view of a top cover assembly according to an embodiment of this application.
Figure 7:
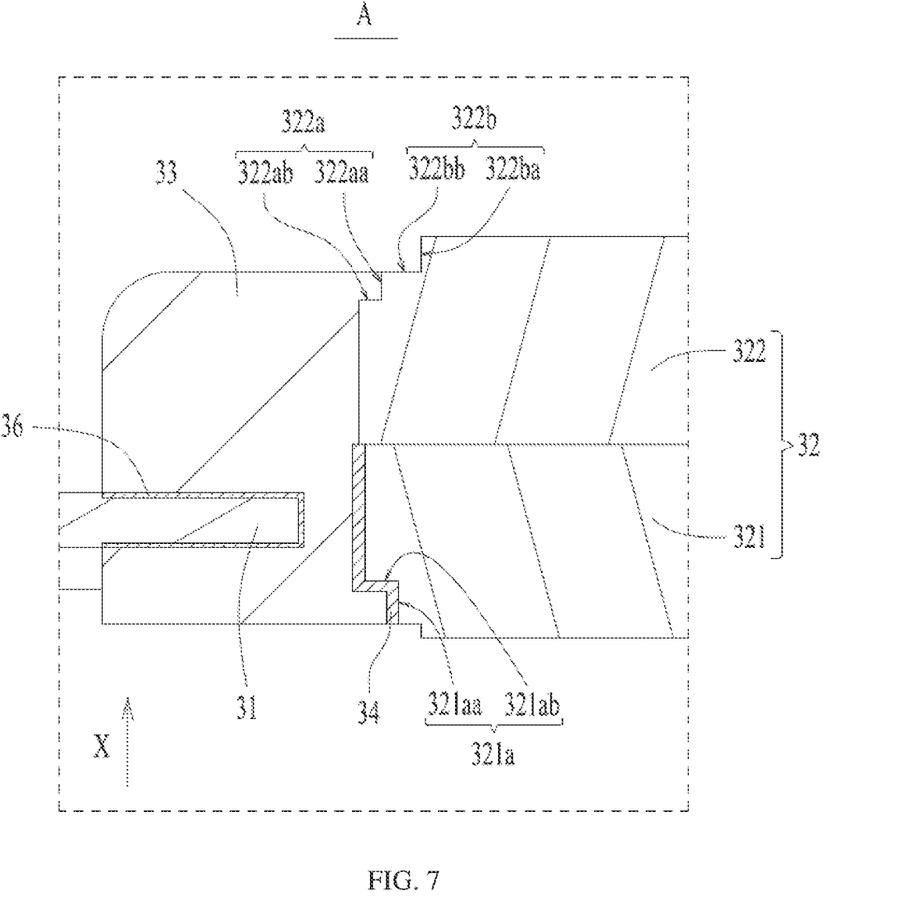
FIG. 7 is an enlarged view of A in FIG. 6.

Referring to FIG. 5 to FIG. 7, the top cover assembly 30 in this embodiment of this application includes a top cover plate 31, a pole 32, an insulation member 33, and a first bonding layer 34. The top cover plate 31 includes an outer surface 31a and an inner surface 31b disposed opposite each other in a thickness direction of the top cover plate, and an electrode lead-out hole 31c extending along the thickness direction. An axial direction X of the electrode lead-out hole 31c is the same as the thickness direction of the top cover plate 31. The pole 32 is inserted into the electrode lead-out hole 31c and hermetically mates with the top cover plate 31 through the insulation member 33 and the first bonding layer 34. The pole 32 includes a first metal layer 321 and a second metal layer 322. The first metal layer 321 and the second metal layer 322 are stacked along a direction from the inner surface 31b to the outer surface 31a of the top cover plate 31. That is, when the position shown in FIG. 6 is used as a reference, the inner surface 31b of the top cover plate 31 faces downward, and the outer surface 31a faces upward. The first metal layer 321 is located below the second metal layer 322. The first bonding layer 34 is disposed between the insulation member 33 and the first metal layer 321. The first metal layer 321 and the first bonding layer 34 are bonded by a chemical bond. The insulation member 33 and the first bonding layer 34 are bonded by a chemical bond. The insulation member 33 is hermetically connected to the first metal layer 321 through the first bonding layer 34.

According to the secondary battery 20 in this embodiment of this application, the pole 32 hermetically mates with the top cover plate 31 through the first bonding layer 34 and the insulation member 33. The first metal layer 321 and the first bonding layer 34 are bonded by a chemical bond, the insulation member 33 and the first bonding layer 34 are bonded by a chemical bond, and therefore, tight and reliable connections are formed between the first metal layer 321 and the first bonding layer 34 and between the insulation member 33 and the first bonding layer 34, effectively improving the connection strength between the first metal layer 321 and the insulation member 33, reducing the possibility of sealing failure or sealing performance deterioration, between the first metal layer 321 and the insulation member 33, caused when the insulation member 33 shifts or falls off, and reducing the possibility that an electrolyte corrodes the first metal layer 321 after entering between the insulation member 33 and the first metal layer 321 or overflows from the pole 32, thereby improving use safety of the secondary battery using the top cover assembly 30.

In an embodiment, the first metal layer 321 is made of copper or copper alloy. When the pole 32 is used as a negative electrode, the first metal layer 321 is made of a material same as that of a negative electrode adapting piece or a negative tab. This is beneficial to welding of the first metal layer 321 and the negative electrode adapting piece or the first metal layer 321 and the tab. First, the first metal layer 321 is subject to triazine treatment to form a triazine thiolate copper salt film on a surface of the first metal layer 321, and then the first metal layer 321 is treated with a superoxide solution composed of hydrogen peroxide, potassium peroxide, sodium peroxide, and hydroperoxide, to form a first oxide film containing copper oxide, thereby forming the first bonding layer 34 including the first oxide film and a triazine thiol derivative. The copper element and the triazine thiol derivative can generate a copper (Cu)-sulfur (S) chemical bond, and the triazine thiol derivative forms a covalent bond with the insulation member 33. Finally, the first metal layer 321 is combined with an injected thermoplastic material under high temperature and high pressure to form an integrated structure. The injected thermoplastic material finally forms the insulation member 33. The integral structure herein means that the first metal layer 321 and the insulation member 33 cannot be detached after being combined, and the two are connected to form an integral structure. In some embodiments, the insulation member 33 may be made of a thermoplastic material such as polyphenylene sulfide or polybutylene terephthalate.

In an embodiment, as shown in FIG. 7, at least part of an outer peripheral surface of the first metal layer 321 is covered by the first bonding layer 34 along the axial direction X of the electrode lead-out hole 31c. In some embodiments, an entire outer peripheral surface of the first metal layer 321 is covered by the first bonding layer 34. This is beneficial to increasing an area of a connection region between the first metal layer 321, the first bonding layer 34, and the insulation member 33, and improving connection strength and sealing reliability. In an example, a thickness D of the first bonding layer 34 is 50 nanometers to 500 nanometers, and in some embodiments, the thickness D of the first bonding layer 34 is 80 nanometers to 300 nanometers. The thickness D of the first bonding layer 34 is a thickness value in a direction leaving the first metal layer 321.

In an embodiment, a thickness of the first metal layer 321 is greater than or equal to that of the second metal layer 322 along the axial direction X of the electrode lead-out hole 31c. This is beneficial to further increasing the area of the connection region between the first metal layer 321, the first bonding layer 34, and the insulation member 33, and improving the connection strength and sealing reliability.

In an embodiment, a maximum outer diameter of the pole 32 is less than a minimum aperture of the electrode lead-out hole 31c. Along the axial direction X of the electrode lead-out hole 31c, orthographic projection of the pole 32 falls inside orthographic projection of a hole wall of the electrode lead-out hole 31c. This is beneficial to reducing a size of the pole 32 and reducing space utilization of the pole 32. When the pole 32 itself receives external stress in the axial direction, the pole 32 transmits the stress to the top cover plate 31 through the first bonding layer 34 and the insulation member 33. The first bonding layer 34 is disposed between the insulation member 33 and the first metal layer 321. This indirectly enhances connection strength between the insulation member 33 and the first metal layer 321, thereby reducing the possibility of sealing failure or sealing performance deterioration, between the first metal layer 321 and the insulation member 33, caused by separation or falling loose of the first metal layer 321 and the insulation member 33 when the pole 32 itself receives external stress in the axial direction.

In an embodiment, the insulation member 33 may be made of a thermoplastic material such as polyphenylene sulfide or polybutylene terephthalate. In an example, the insulation member 33 further includes a barium sulfate particle. The barium sulfate particles can help improve structural strength of the insulation member 33, so that the insulation member 33 itself has high tensile resistance. In some embodiments, a particle size of the barium sulfate particle is 0.1 micrometer to 4 micrometers. In another example, the insulation member 33 includes a fiber structure. The fiber structure can help improve structural strength of the insulation member 33, so that the insulation member 33 itself has high tensile resistance. In some embodiments, a length of the fiber structure is 40 to 220 microns. The fiber structure may be a carbon fiber or a glass fiber.

In an embodiment, referring to FIG. 7, the first metal layer 321 has a first concave portion 321a facing away from the second metal layer 322. The first concave portion 321a has a first axially extending surface 321aa and a first radially extending surface 321ab that intersect with each other. Part of the insulation member 33 extends into the first concave portion 321a. The first bonding layer 34 extends to between the first concave portion 321a and the insulation member 33. The part of the insulation member 33 extending into the first concave portion 321a and the part of the first bonding layer 34 extending to the first concave portion 321a can jointly limit a position of the pole 32 in the axial direction. This is beneficial to further reducing the possibility that the pole 32 shifts in the axial direction when receiving stress in the axial direction. In an example, the first concave portion 321a penetrates through the outer peripheral surface of the first metal layer 321. In an example, there is one annular first concave portion 321a. The first concave portion 321a extends along a circumferential direction of the pole 32. In another example, there are two or more first concave portions 321a. The two first concave portions 321a are spaced apart along a circumferential direction of the pole 32.

Figure 8:
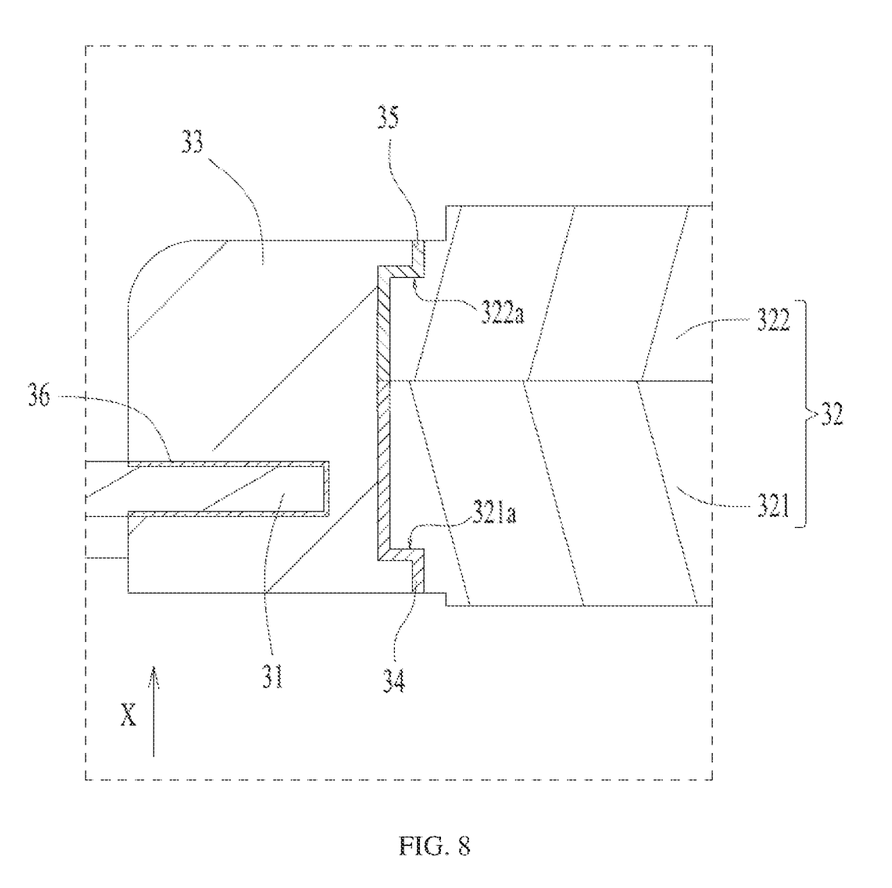
FIG. 8 is a partial schematic structural cross-sectional view of a top cover assembly according to another embodiment of this application.

In an embodiment, referring to FIG. 8, the top cover assembly 30 further includes a second bonding layer 35. The second bonding layer 35 is disposed between the insulation member 33 and the second metal layer 322. The second metal layer 322 and the second bonding layer 35 are bonded by a chemical bond. The insulation member 33 and the second bonding layer 35 are bonded by a chemical bond. The insulation member 33 is hermetically connected to the second metal layer 322 through the second bonding layer 35. In this way, the insulation member 33 is hermetically connected to the first metal layer 321 through the first bonding layer 34, and is hermetically connected to the second metal layer 322 through the second bonding layer 35. Therefore, overall connection strength and sealing reliability of the insulation member 33 and the pole 32 are further improved, reducing the possibility of sealing failure or sealing performance deterioration caused by relative displacement between the insulation member 33 and the pole 32, thereby reducing the possibility that an electrolyte corrodes the second metal layer 322 after entering between the insulation member 33 and the second metal layer 322 or overflows from the pole 32.

In an embodiment, the second metal layer 322 is made of aluminum or aluminum alloy. When the pole 32 is used as a negative electrode, the second metal layer 322 is made of a material same as that of a current collection sheet 40. This is beneficial to welding of the second metal layer 322 and the current collection sheet 40. First, the second metal layer 322 is subject to oxidization to form a second oxide film on a surface of the second metal layer 322, and then is subject to triazine treatment to form a triazine thiol derivative inside or on a surface of the second oxide film, thereby forming the second bonding layer 35 including the second oxide film and the triazine thiol derivative. The aluminum element and the triazine thiol derivative can generate an Al—S chemical bond, and the triazine thiol derivative forms a covalent bond with the insulation member 33. Finally, the second metal layer 322 is combined with an injected thermoplastic material under high temperature and high pressure to form an integrated structure. The injected thermoplastic material finally forms the insulation member 33. In some embodiments, the insulation member 33 may be made of a thermoplastic material such as polyphenylene sulfide or polybutylene terephthalate.

In an embodiment, the first metal layer 321 is made of copper or copper alloy. the second metal layer 322 is made of aluminum or aluminum alloy. The first metal layer 321 and the second metal layer 322 are compositely connected through a composite process.

In an embodiment, at least part of an outer peripheral surface of the second metal layer 322 is covered by the second bonding layer 35 along the axial direction X of the electrode lead-out hole 31c. In some embodiments, an entire outer peripheral surface of the second metal layer 322 is covered by the second bonding layer 35. This is beneficial to increasing an area of a connection region between the second metal layer 322, the second bonding layer 35, and the insulation member 33, and improving connection strength and sealing reliability. In an example, a thickness of the second bonding layer 35 is 50 nanometers to 500 nanometers, and in some embodiments, the thickness of the second bonding layer 35 is 80 nanometers to 300 nanometers.

In an embodiment, referring to FIG. 8, the second metal layer 322 has a second concave portion 322a facing away from the first metal layer 321. The second concave portion 322a has a second axially extending surface 322aa and a second radially extending surface 322ab that intersect with each other. Part of the insulation member 33 extends into the second concave portion 322a. The second bonding layer 35 extends to between the second concave portion 322a and the insulation member 33. The part of the insulation member 33 extending into the second concave portion 322a and the part of the second bonding layer 35 extending to the second concave portion 322a can jointly limit a position of the pole 32 in an axial direction. This is beneficial to further reducing the possibility that the pole 32 shifts in the axial direction when receiving stress in the axial direction. In an example, the second concave portion 322a penetrates through the outer peripheral surface of the second metal layer 322. In an example, there is one annular second concave portion 322a. The second concave portion 322a extends along a circumferential direction of the pole 32. In another example, there are two or more second concave portions 322a. The two first concave portions 321a are spaced apart along a circumferential direction of the pole 32.

In an embodiment, referring to FIG. 8, the second metal layer 322 has a third concave portion 322b facing away from the first metal layer 321. The third concave portion 322b has a third axially extending surface 322ba and a third radially extending surface 322bb connected to the second concave portion 322a. In the axial direction X of the electrode lead-out hole 31c, the insulation member 33 does not protrude from the third radially extending surface 322bb. When two secondary batteries 20 are connected in series or in parallel by a current collection sheet 40, the current collection sheet 40 is welded to an end surface of the second metal layer 322 leaving the first metal layer 321. Because the second metal layer 322 has the third concave portioned portion 322b, the current collection sheet 40 is not in contact with the insulation member 33, thereby reducing the possibility that the insulation member 33 deforms and sealing performance is affected because the current collection sheet 40 is in contact with and squeezes the insulation member 33.

In an embodiment, the insulation member 33 is connected to the first metal layer 321 through the first bonding layer 34, and the insulation member 33 hermetically mates with the first bonding layer 34, and the first bonding layer 34 hermetically mates with the first metal layer 321. The second metal layer 322 is directly connected to the insulation member 33, tensile strength between the first metal layer 321 and the first bonding layer 34 is greater than tensile strength between the second metal layer 322 and the insulation member 33, and tensile strength between the insulation member 33 and the first bonding layer 34 is greater than the tensile strength between the second metal layer 322 and the insulation member 33. Therefore, after the second metal layer 322 is welded to a current collection sheet 40, when an end of the second metal layer 322 leaving the first metal layer 321 is subject to a pulling force from the current collection sheet 40, the second metal layer 322 is allowed to move slightly. However, the pulling force does not cause the first metal layer 321 to be separated from the insulation member 33, thereby improving sealing reliability of the pole 32 and the insulation member 33.

In an embodiment, referring to FIG. 7 and FIG. 8, the top cover assembly 30 further includes a third bonding layer 36. The third bonding layer 36 is disposed between the top cover plate 31 and the insulation member 33. The top cover plate 31 and the third bonding layer 36 are bonded by a chemical bond. The insulation member 33 and the third bonding layer 36 are bonded by a chemical bond. The insulation member 33 is hermetically connected to the top cover plate 31 through the third bonding layer 36. The top cover plate 31 and the third bonding layer 36 are bonded by a chemical bond, and the insulation member 33 and the third bonding layer 36 are bonded by a chemical bond. Therefore, tight and reliable connections are formed between the top cover plate 31 and the third bonding layer 36 and between the insulation member 33 and the third bonding layer 36, effectively improving connection strength between the top cover plate 31 and the insulation member 33, and reducing the possibility of sealing failure or sealing performance deterioration, between the top cover plate 31 and the insulation member 33, caused when the insulation member 33 shifts or falls off, thereby improving use safety of the secondary battery 20.

In an embodiment, the top cover plate 31 is made of aluminum or aluminum alloy. First, the top cover plate 31 is subject to oxidization to form a third oxide film on a surface of the top cover plate 31, and then is subject to triazine treatment to form a triazine thiol derivative inside or on a surface of the third oxide film, thereby forming the third bonding layer 36 including the third oxide film and the triazine thiol derivative. The aluminum element and the triazine thiol derivative generate an Al—S chemical bond, and the triazine thiol derivative forms a covalent bond with the insulation member 33. Finally, the top cover plate 31 is combined with an injected thermoplastic material under high temperature and high pressure to form an integrated structure. The injected thermoplastic material finally forms the insulation member 33. In some embodiments, the insulation member 33 may be made of a thermoplastic material such as polyphenylene sulfide or polybutylene terephthalate.

In an embodiment, the top cover plate 31 is made of copper or copper alloy. First, the top cover plate 31 is subject to triazine treatment to form a triazine thiolate copper salt film on a surface of the top cover plate 31, and then the top cover plate 31 is treated with a superoxide solution composed of hydrogen peroxide, potassium peroxide, sodium peroxide, and hydroperoxide, to form a third oxide film containing copper oxide, thereby forming the third bonding layer 36 including the third oxide film and a triazine thiol derivative. The copper element and the triazine thiol derivative can generate a Cu—S chemical bond, and the triazine thiol derivative forms a covalent bond with the insulation member 33. Finally, the top cover plate 31 is combined with an injected thermoplastic material under high temperature and high pressure to form an integrated structure. The injected thermoplastic material finally forms the insulation member 33. The integral structure herein means that the top cover plate 31 and the insulation member 33 cannot be detached after being combined, and the two are connected to form an integral structure. In some embodiments, the insulation member 33 may be made of a thermoplastic material such as polyphenylene sulfide or polybutylene terephthalate.

In an embodiment, the top cover assembly 30 further includes an insulation plate 37. The insulation plate 37 is disposed below the top cover plate 31. The insulation plate 37 has a through hole corresponding to the electrode lead-out hole 31c. The insulation plate 37 is used to press the electrode assembly 22 to reduce the possibility of the electrode assembly 22 moving in the housing 21. In some embodiments, the insulation plate 37 may be made of rubber or plastic.

The secondary battery 20 in this embodiment of this application includes the top cover plate 31, the pole 32, the first bonding layer 34, and the insulation member 33. The insulation member 33 is used to seal the top cover plate 31 and the pole 32. The insulation member 33 is connected and fastened to the first metal layer 321 through the first bonding layer 34, the insulation member 33 and the first bonding layer 34 are bonded by a chemical bond, and the first metal layer 321 and the first bonding layer 34 are also bonded by a chemical bond, effectively improving connection strength and sealing reliability of the first metal layer 321 and the insulation member 33, reducing the possibility of sealing failure or sealing performance deterioration caused by relative displacement between the insulation member 33 and the pole 32, and then reducing the possibility that an electrolyte corrodes the first metal layer 321 after entering between the insulation member 33 and the first metal layer 321 or overflows from the pole 32, thereby improving safety of the secondary battery 20.

Although this application has been described with reference to some embodiments, various improvements can be made to this application and equivalents can be substituted for the components therein without departing from the scope of this application. In particular, the technical features in the embodiments can be combined in any manner provided that there is no structural conflict. This application is not limited to the specific embodiments disclosed herein, but includes all technical solutions falling within the scope of the claims.

What is claimed is:
1. A secondary battery, comprising:
a top cover plate, having an outer surface and an inner surface disposed opposite each other in a thickness direction of the top cover plate and an electrode lead-out hole extending along the thickness direction;
a pole, disposed in the electrode lead-out hole, wherein the pole comprises a first metal layer and a second metal layer, and the first metal layer and the second metal layer are stacked along a direction from the inner surface to the outer surface;

an insulation member, disposed between the top cover plate and the pole; and a first bonding layer, disposed between the insulation member and the first metal layer, wherein the first metal layer and the first bonding layer are bonded by a chemical bond, the insulation member and the first bonding layer are bonded by a chemical bond, and the insulation member is hermetically connected to the first metal layer through the first bonding layer;

wherein the first metal layer has a first concave portion facing away from the second metal layer, part of the insulation member extends into the first concave portion, and the first bonding layer extends to between the first concave portion and the insulation member;

wherein the secondary battery further comprises a second bonding layer, the second bonding layer is disposed between the insulation member and the second metal layer, the second metal layer and the second bonding layer are bonded by a chemical bond, the insulation member and the second bonding layer are bonded by a chemical bond, and the insulation member is hermetically connected to the second metal layer through the second bonding layer;

the second metal layer has a second concave portion facing away from the first metal layer, part of the insulation member extends into the second concave portion, and the second bonding layer extends to between the second concave portion and the insulation member.

2. The secondary battery according to claim 1, wherein there is only one annular first concave portion, or there are two or more first concave portions, and the two or more first concave portions are spaced apart along a circumferential direction of the pole.

3. The secondary battery according to claim 1, wherein there is only one annular second concave portion, or there are two or more second concave portions, and the two or more second concave portions are spaced apart along the circumferential direction of the pole.

4. The secondary battery according to claim 1, wherein the first metal layer is a copper layer or a copper alloy layer, and the second metal layer is an aluminum layer or an aluminum alloy layer; and/or the first bonding layer comprises a first oxide film and a triazine thiol derivative disposed on the first oxide film, and the second bonding layer comprises a second oxide film and a triazine thiol derivative disposed on the second oxide film.

5. The secondary battery according to claim 1, wherein the second metal layer is directly connected to the insulation member, tensile strength between the first metal layer and the first bonding layer is greater than tensile strength between the second metal layer and the insulation member, and tensile strength between the insulation member and the first bonding layer is greater than the tensile strength between the second metal layer and the insulation member.

6. The secondary battery according to claim 1, wherein the secondary battery further comprises a third bonding layer, the third bonding layer is disposed between the top cover plate and the insulation member, the top cover plate and the third bonding layer are bonded by a chemical bond, the insulation member and the third bonding layer are bonded by a chemical bond, and the insulation member is hermetically connected to the top cover plate through the third bonding layer.

7. The secondary battery according to claim 6, wherein the top cover plate is an aluminum layer or an aluminum alloy layer; the first bonding layer comprises the first oxide film and the triazine thiol derivative disposed on the first oxide film, and the third bonding layer comprises a third oxide film and a triazine thiol derivative disposed on the third oxide film.

8. The secondary battery according to claim 1, wherein a thickness of the first metal layer is greater than or equal to that of the second metal layer along an axial direction of the electrode lead-out hole.

9. The secondary battery according to claim 1, wherein the insulation member comprises barium sulfate particles; and/or the insulation member comprises a fiber structure.

10. The secondary battery according to claim 1, wherein at least part of an outer peripheral surface of the first metal layer is covered by the first bonding layer along the axial direction of the electrode lead-out hole.

11. A battery column, comprising the secondary battery according to claim 1.

12. An apparatus using a secondary battery as a power source, comprising the secondary battery according to claim 1.

* * * * *